United States Patent
Simon (10) Patent No.: US 12,391,160 B2
(45) Date of Patent: Aug. 19, 2025

(54) ELECTRONIC CONTROL UNIT FOR A HEATING DEVICE

(71) Applicant: GENTHERM GMBH, Odelzhausen (DE)

(72) Inventor: Dávid Szabolcs Simon, Budapest (HU)

(73) Assignee: GENTHERM GMBH, Odelzhausen (DE)

(*) Notice: Subject to any disclaimer, the term of this patent is extended or adjusted under 35 U.S.C. 154(b) by 990 days.

(21) Appl. No.: 17/440,032

(22) PCT Filed: Mar. 27, 2020

(86) PCT No.: PCT/DE2020/000069
§ 371 (c)(1),
(2) Date: Sep. 16, 2021

(87) PCT Pub. No.: WO2020/192816
PCT Pub. Date: Oct. 1, 2020

(65) Prior Publication Data
US 2023/0191966 A1    Jun. 22, 2023

(30) Foreign Application Priority Data
Mar. 28, 2019  (DE) .......................... 202019005342.5

(51) Int. Cl.
*B60N 2/56* (2006.01)
*H05B 1/02* (2006.01)

(52) U.S. Cl.
CPC ......... *B60N 2/5685* (2013.01); *H05B 1/0238* (2013.01)

(58) Field of Classification Search
CPC ............................ H05B 1/0238; B60N 2/5685
(Continued)

(56) References Cited

U.S. PATENT DOCUMENTS 7,145,787 B2 * 12/2006 Lanni ................. H01R 13/6675
                                                              363/80
8,704,630 B2 *  4/2014 Melvin, Jr. ........ G05B 23/0289
                                                             219/490
(Continued)

FOREIGN PATENT DOCUMENTS

DE        19811823 A1    9/1999
DE    202014003827 U1    8/2015
(Continued)

OTHER PUBLICATIONS

WO 2007102502 A1 Translation (Year: 2007).*
(Continued)

*Primary Examiner* — Eric S Stapleton
(74) *Attorney, Agent, or Firm* — The Dobrusin Law Firm, P.C.

(57) ABSTRACT

An electronic control unit for a heating device of a vehicle seat that includes: a printed circuit board on which one or more heat sources are arranged; a printed circuit board temperature sensor which is thermally coupled to at least one of the one or more heat sources on the printed circuit board; and at least one heating wire temperature sensor configured to be thermally coupled to a heating wire of the heating device; and a data processing device configured to determine a temperature of the heating wire based on temperature measured values of the printed circuit board temperature sensor and of the at least one heating wire temperature sensor.

23 Claims, 4 Drawing Sheets

(58) Field of Classification Search
USPC .......................................................... 219/494
See application file for complete search history.

(56) References Cited

U.S. PATENT DOCUMENTS

| | | | |
|---|---|---|---|
| 9,510,393 B2* | 11/2016 | Lochmann | B60N 2/5685 |
| 2003/0222068 A1* | 12/2003 | Horey | H05B 3/342 |
| | | | 219/494 |
| 2008/0302783 A1* | 12/2008 | Wong | H05B 1/0233 |
| | | | 219/494 |
| 2015/0327330 A1* | 11/2015 | Lochmann | B60N 2/5685 |
| | | | 219/494 |

FOREIGN PATENT DOCUMENTS

| | | | | |
|---|---|---|---|---|
| EP | 1929901 A1 | | 6/2008 | |
| EP | 2805869 A1 | | 11/2014 | |
| EP | 3211708 A1 | | 8/2017 | |
| JP | H08233299 A | * | 9/1996 | ............. H05B 3/342 |
| WO | WO-2007102502 A1 | * | 9/2007 | ........... H05B 1/0238 |

OTHER PUBLICATIONS

JP H08233299 A Translation (Year: 1996).*
International Search Report and Written Opinion for International Application PCT/DE2020/000069, dated Sep. 16, 2020.

* cited by examiner

ELECTRONIC CONTROL UNIT FOR A HEATING DEVICE

PRIORITY

This application is a US National Stage Entry under 35 U.S.C. § 371 of PCT Application Number PCT/DE2020/000069 filed on Mar. 27, 2020, which claims priority to DE 20 2019 005 342.5 filed on Mar. 28, 2019, all of which are hereby incorporated by reference herein for all purposes.

FIELD

These teachings relate to an electronic control unit for a heating device of a vehicle seat.

BACKGROUND

Modern vehicles regularly have seat heating, the heating wires of which are controlled or regulated by an electronic control unit. During the operation of the heating device, the temperature is monitored in one or more regions of the heating wire in order to be able to implement temperature-dependent control and/or regulation functions.

Temperature sensors designed as thermistors are regularly used for detecting the temperature. The thermistors can be designed, for example, as NTC resistors, that is, heating conductors. The temperature sensors are usually arranged either directly on the heating wire or in a heating region of the vehicle seat.

The need for separate temperature sensors leads to an increased number of parts and thus to increased system complexity. This is accompanied by increased material costs, wherein the separate arrangement of the temperature sensors also leads to increased assembly costs. Overall, temperature detection in heating devices that use one or more heating wires is still comparatively complex.

SUMMARY

The object on which the invention is based is thus to simplify the detection of the temperature of a heating wire of a heating device of a vehicle seat without unduly impairing the detection accuracy.

The object is achieved by an electronic control unit of the type mentioned at the outset, wherein the electronic control unit according to the invention has a data processing device which is configured to determine the temperature of the heating wire based on the temperature measured values of the printed circuit board temperature sensor and the at least one heating wire temperature sensor.

These teachings relate to an electronic control unit for a heating device of a vehicle seat, having a printed circuit board on which one or more heat sources are arranged, a printed circuit board temperature sensor which is thermally coupled to at least one heat source on the printed circuit board, and at least one heating wire temperature sensor, which is configured to be thermally coupled to a heating wire of the heating device.

The invention further relates to a heating device for a vehicle seat, having at least one heatable heating wire and an electronic control unit which is configured to control the heating of the heating wire and to monitor the temperature of the heating wire.

The invention also relates to a vehicle seat having a seat cushion that provides a seat surface for the buttocks of a user, a backrest that provides a backrest surface for the back of the user, and a heating device which has one or more heating wires integrated into the seat cushion and/or the backrest and is configured to heat the seat surface and/or the backrest surface via the one or the plurality of heating wires.

In addition, the invention relates to a method for operating a heating device of a vehicle seat, having the steps: detecting a temperature value by means of a printed circuit board temperature sensor of an electronic control unit of the heating device, wherein the printed circuit board temperature sensor is thermally coupled to at least one heat source on a printed circuit board of the electronic control unit, and detecting at least one temperature measured value by means of at least one heating wire temperature sensor of the electronic control unit, which is thermally coupled to a heating wire of the heating device.

The invention makes use of the knowledge that when using temperature sensors which are integrated into the electronic control unit, no direct temperature detection on the heating wire is possible, since corresponding temperature measured values are falsified by the one or the plurality of heat sources of the electronic control unit. The heating wire temperature sensor thus determines the temperature of the heating wire only approximately, since the integration of the heating wire temperature sensor into the electronic control unit falsifies the temperature measured values due to thermal influences. Taking into account the temperature measured values of the printed circuit board temperature sensor, the measured value falsifications caused by the thermal influences can, however, be calculated out again, so that the temperature of the heating wire can be determined with sufficient accuracy. The integration of the printed circuit board temperature sensor and the at least one heating wire temperature sensor in the electronic control unit results in significantly reduced system complexity. In addition, the material costs and the assembly effort are reduced.

The data processing device preferably takes into account one or more constants for determining the temperature of the heating wire based on the temperature measured values of the printed circuit board temperature sensor and the at least one heating wire temperature sensor. The constants are preferably dependent on unit and/or heating wire parameters and/or characterize the thermal conductivity properties of different regions of the electronic control unit. The one or the plurality of heat sources can be integrated circuits, particularly microcontrollers or drivers of the heating device. The one or the plurality of heat sources can include a low-side driver (LS circuit) and/or a high-side driver (HS circuit). The one or the plurality of heat sources can include one or more voltage regulators.

In a preferred embodiment of the electronic control unit according to the invention, the printed circuit board temperature sensor and/or the at least one heating wire temperature sensor are each designed as a thermistor. The thermistor can be designed as an NTC resistor, that is, as a heating conductor. Alternatively or additionally, the printed circuit board temperature sensor and/or the at least one heating wire temperature sensor are arranged on the printed circuit board. Particularly, the printed circuit board temperature sensor and/or the at least one heating wire temperature sensor is fastened to the printed circuit board. Alternatively or additionally, the printed circuit board temperature sensor and/or the at least one heating wire temperature sensor are integrated or embedded in the printed circuit board or in an electronic component arranged on the printed circuit board. For example, the printed circuit board temperature sensor can be integrated into a microcontroller unit which is arranged on the printed circuit board.

In a further preferred embodiment of the electronic control unit according to the invention, the at least one heating wire temperature sensor is thermally insulated from the one or the plurality of heat sources arranged on the printed circuit board and/or the printed circuit board temperature sensor. The thermal insulation of the at least one heating wire temperature sensor is preferably implemented by a heat flow barrier of the printed circuit board. The thermal insulation of the heating wire temperature sensor essentially prevents heat conduction through the body of the printed circuit board which would falsify the temperature measured values.

In another preferred embodiment of the electronic control unit according to the invention, the printed circuit board has at least one recess which is positioned between the at least one heating wire temperature sensor and at least one heat source arranged on the printed circuit board or the printed circuit board temperature sensor. The at least one recess in the printed circuit board serves as a thermal barrier, so that heat conduction between the one or the plurality of heat sources or the printed circuit board temperature sensor and the at least one heating wire temperature sensor is essentially avoided. The recess can, for example, be L-shaped or arcuate in form and surround the heating wire temperature sensor along a circumferential segment.

In another preferred embodiment, the electronic control unit according to the invention has a first heating wire temperature sensor and a second heating wire temperature sensor, which are each configured to be thermally coupled to a heating wire of the heating device. The data processing device is preferably configured to determine a first heating wire temperature based on the temperature measured values of the first heating wire temperature sensor and a second heating wire temperature based on the temperature measured values of the second heating wire temperature sensor. Particularly, the data processing device is configured not to take into account the temperature measured values of the second heating wire temperature sensor when determining the first heating wire temperature. Particularly, the data processing device is configured not to take into account the temperature measured values of the first heating wire temperature sensor when determining the second heating wire temperature. The two heating wire temperatures are thus determined independently of one another by the data processing device. There are no corrections or adjustments to the temperature measured values of the first heating wire temperature sensor by the temperature measured values of the second heating wire temperature sensor. Furthermore, no corrections or adjustments are made to the temperature measured values of the second heating wire temperature sensor by the temperature measured values of the first heating wire temperature sensor. The functional redundancy of the first and second heating wire temperature sensors, for example, meet the criteria of the safety requirement level Automotive Safety Integrity Level (ASIL) A to D specified in ISO 26262. For example, the data processing device is configured to monitor the temperature measured values of the first heating wire temperature sensor and the temperature measured values of the second heating wire temperature sensor and to compare them with one another. If the difference between the temperature measured values of the first heating wire temperature sensor and the temperature measured values of the second heating wire temperature sensor exceeds a predetermined threshold, the data processing device determines a defect or a functional impairment of a heating wire temperature sensor. If it is guaranteed that the heating wire temperature sensors do not suffer a defect or malfunction at the same time, effective and safe function monitoring can be implemented via the measured value comparison.

If the difference between the temperature measured values of the first heating wire temperature sensor and the temperature measured values of the second heating wire temperature sensor exceeds a predetermined threshold and the data processing device determines a defect or a functional impairment of a heating wire temperature sensor, it is preferred that a heating wire temperature regulation is based on the higher temperature measured value of the heating wire temperature sensors, so that the setting of an excessively high temperature on the heating wire is avoided even in the event of a failure or functional impairment of a heating wire temperature sensor. Ultimately, the set temperature on a heated backrest surface of a backrest and/or the set temperature of a heated seat surface of a seat cushion is below the set-point temperature, but at the same time excessively high temperatures are avoided.

In an advantageous development of the electronic control unit, the data processing device is configured to determine a first heating wire temperature based on the temperature measured values of the first heating wire temperature sensor and the printed circuit board temperature sensor and a second heating wire temperature based on the temperature measured values of the second heating wire temperature sensor and the printed circuit board temperature sensor. The first heating wire temperature sensor and the second heating wire temperature sensor only approximately determine the temperature of the heating wire. However, taking into account the temperature measured values of the printed circuit board temperature sensor, the measured value falsifications caused by the thermal influences can be calculated out, so that two heating wire temperatures are determined. Redundant temperature measurement and thus redundant temperature monitoring can be implemented in this way. Corresponding heating devices can be classified as safety-relevant electrical or electronic systems in a vehicle. Corresponding systems regularly need to comply with one or more safety standards. In order to be able to guarantee the functional safety of a corresponding system, redundant temperature detection is regularly required in the corresponding safety standards in order to avoid risks and system errors in the event of a sensor failure or in the event of a functional impairment of a sensor. In the present case, the use of three different temperature sensors, namely two heating wire temperature sensors and one printed circuit board temperature sensor, enables such a redundant detection of the heating wire temperature.

In a further development of the control unit according to the invention, the data processing device is configured to carry out a functional test of the temperature sensors during a start-up process of the control unit. As part of the functional test, the corrected temperature measured values of the first heating wire temperature sensor, which already take into account the temperature measured values of the printed circuit board temperature sensor, and the corrected temperature measured values of the second heating wire temperature sensor, which also take into account the temperature measured values of the printed circuit board temperature sensor, are compared with one another. In this case, the difference between the corrected temperature measured values of the first and second heating wire temperature sensors must not lie outside a predetermined tolerance range after a start-up time has elapsed after the starting process. A start-up time after the control unit has been started is taken into account, since the correction of the temperature measured values of the first and second heating wire temperature sensors via the temperature measured values of the printed circuit board temperature sensor only provides reliable values after a specific operating temperature window has been reached. If the difference between the corrected temperature measured values of the first and second heating wire temperature sensors lies outside a tolerance range even after the start-up time has elapsed, a defect or a functional impairment is determined by the data processing device.

A control unit according to the invention is also advantageous in which the first heating wire temperature sensor, the second heating wire temperature sensor and the data processing device are connected to one another and to a voltage source in an interconnection such that either only one heating wire temperature sensor fails in the event of a line defect in the interconnection or the data processing device can detect the failure of both heating wire temperature sensors. The line defect can be a line interruption. Furthermore, the line defect can also not lead to a complete interruption of the respective line, but only to a change in the electrical resistance. The interconnection can comprise lines for the power supply of the first heating wire temperature sensor, the second heating wire temperature sensor and/or the data processing device by the voltage source. Furthermore, the interconnection can comprise lines for measurement signal transmission between the first heating wire temperature sensor and the data processing device and/or between the second heating wire temperature sensor and the data processing device.

The electronic control unit according to the invention is furthermore advantageously developed in that the first heating wire temperature sensor and the second heating wire temperature sensor are each arranged in corner regions of the printed circuit board. The corner regions in which the heating wire temperature sensors are arranged are preferably thermally decoupled from the remaining regions of the printed circuit board via a recess in the printed circuit board. Heat transfer from the one or the plurality of heat sources on the printed circuit board into the corner regions of the printed circuit board is thus essentially avoided.

In another preferred embodiment of the electronic control unit according to the invention, the data processing device is configured to compare the first heating wire temperature and the second heating wire temperature with one another for detecting a functional impairment, particularly a defect, of the first heating wire temperature sensor, the second heating wire temperature sensor and/or the printed circuit board temperature sensor. If the difference between the first heating wire temperature and the second heating wire temperature lies above a differential temperature limit value, a functional impairment, particularly a defect, of the first heating wire temperature sensor, the second heating wire temperature sensor and/or the printed circuit board temperature sensor can be assumed. The differential temperature limit value can be a static or a dynamic value. The differential temperature limit value can be dependent, for example, on the temperature value detected by the printed circuit board temperature sensor. Furthermore, the differential temperature limit value can be a parameterized value that is independent of the heating device and/or the vehicle seat, which parameterized value is determined, for example, by a microcontroller of the electronic control unit during operation. The electronic control unit can thus be used in different heating devices and/or vehicle seats without a time-consuming and costly determination of a specific differential temperature limit value for the different heating devices and/or vehicle seats having to take place in advance. The electronic control unit can thus be used extremely universally in combination with various heating devices and/or vehicle seat constructions. A functional impairment or a defect can result from an interrupted circuit or a short circuit. Furthermore, a functional impairment can occur due to a fastening. Furthermore, continuous external temperature influences can lead to a functional impairment. In addition, damage to the heating wire can lead to corresponding functional impairments.

In another embodiment of the electronic control unit according to the invention, the data processing device is configured to compare the change over time of the first heating wire temperature and the change over time of the second heating wire temperature with one another for detecting a functional impairment, particularly a defect, of the first heating wire temperature sensor, the second heating wire temperature sensor and/or the printed circuit board temperature sensor. Furthermore, the data processing device can be configured to monitor the maximum value of the first heating wire temperature and/or the second heating wire temperature for detecting a functional impairment, particularly a defect, of the first heating wire temperature sensor, the second heating wire temperature sensor and/or the printed circuit board temperature sensor. If the first heating wire temperature and/or the second heating wire temperature exceed a maximum temperature occurring during normal operation of the control unit, a functional impairment, particularly a defect, of the first heating wire temperature sensor and/or the second heating wire temperature sensor can be assumed.

In a further preferred embodiment of the electronic control unit according to the invention, this is configured to control or regulate the heating of the heating wire as a function of a determined notional heating wire temperature and to determine the notional heating wire temperature taking into account the first heating wire temperature and the second heating wire temperature. In a safe operating mode of the heating device, the notional heating wire temperature can correspond to the higher value from the first heating wire temperature and the second heating wire temperature. This avoids regions of a vehicle seat being excessively heated by temperature control or regulation due to an incorrectly determined heating wire temperature that is too low. If the higher value of the redundantly determined heating wire temperature is always made available in a corresponding temperature control or regulation, an unintentional intensification of the seat heating is avoided. In another operating mode, the notional heating wire temperature can be determined by averaging or weighting the first heating wire temperature and the second heating wire temperature. A regulation or control of the heating of the heating wire can be implemented simultaneously with a function monitoring, so that a functional impairment or a defect of a temperature sensor can also be detected during the control or regulation of the heating of the heating wire.

In a further preferred embodiment of the electronic control unit according to the invention, this is configured to detect a change in distance to one or more heating wires which are thermally coupled to a heating wire temperature sensor of the electronic control unit. If the electronic control unit comprises two heating wire temperature sensors which are thermally coupled to a respective heating wire segment, the electronic control unit can be configured to detect a symmetrical and/or an asymmetrical change in distance to the heating wire segments. In the case of a symmetrical change in distance, the thermal coupling of the two heating wire temperature sensors to the respective heating wire segment is impaired or interrupted to the same extent. In the case of an asymmetrical change in distance, the thermal coupling of the heating wire temperature sensors to the respective heating wire segment is impaired to different degrees or the thermal coupling of only one heating wire temperature sensor to the respective heating wire segment is interrupted. By detecting corresponding changes in distance, changes in position of the heating wire or the heating wires or the electronic control unit can be identified. The changes in distance can be taken into account when evaluating the signals from the temperature sensors. If the measured values of the heating wire temperature sensors change in a similar way, this may indicate a decrease in temperature of the heating wire or a symmetrical change in distance. In this case, a functional impairment of the heating wire temperature sensors can be identified via the printed circuit board temperature sensor. If the measured values of the heating wire temperature sensors change to different degrees, this can indicate a functional impairment of a heating wire temperature sensor or an asymmetrical change in distance. The object on which the invention is based is further achieved by a heating device of the type mentioned at the outset, wherein the electronic control unit of the heating device according to the invention is designed according to one of the embodiments described above. With regard to the advantages and modifications of the heating device according to the invention, reference is first made to the advantages and modifications of the electronic control unit according to the invention.

The at least one heating wire temperature sensor of the electronic control unit is preferably thermally coupled to the at least one heating wire. For example, the heating wire temperature sensor and the at least one heating wire are in contact with one another, so that a thermal coupling is implemented. Alternatively, the heating wire is positioned in the vicinity of the at least one heating wire temperature sensor.

The object on which the invention is based is further achieved by a heatable vehicle seat of the type mentioned at the outset, wherein the heating device of the heatable vehicle seat according to the invention is designed according to one of the embodiments described above. With regard to the advantages and modifications of the heatable vehicle seat according to the invention, reference is first made to the advantages and modifications of the heating device according to the invention and the electronic control unit according to the invention.

In a preferred embodiment of the vehicle seat according to the invention, the data processing device of the electronic control unit is configured to determine the current temperature of the heating device, the current temperature of the backrest surface of the backrest heated by the heating device and/or the current temperature of the seat surface of the seat cushion heated by the heating device based on the temperature measured values of the printed circuit board temperature sensor and/or the at least one heating wire temperature sensor. For this purpose, the data processing device uses at least one calculation algorithm based on previous temperature measured values and current temperature measured values of the printed circuit board temperature sensor and/or the at least one heating wire temperature sensor, wherein the calculation algorithm preferably implements a model predictive regulation or a PID regulation. The calculation algorithm preferably takes into account a temperature profile over time determined by the printed circuit board temperature sensor and/or the at least one heating wire temperature sensor, for example, the temperature rise and/or the temperature drop over time. The temperatures measured by the printed circuit board temperature sensor and/or the at least one heating wire temperature sensor change proportionally to the actual heating wire temperature and the actual temperature of the heated backrest surface or the heated seat surface. This proportionality can be used by the data processing device for determining the current temperature of the heated backrest surface or the heated seat surface. By integrating previous temperature measured values, the data processing device can eliminate or at least significantly weaken temperature influences of the heat sources of the control unit.

The output power can therefore be written as follows:

$$P_{OUT}=K_P*P+*K_I*I+K_DD$$

Wherein $P_{OUT}$ is the output power. $K_P$ is a constant of proportionality, $K_I$ is a constant of integration and $K_D$ is a constant of slope. The constants $K_P$, $K_I$ and $K_D$ can be determined by testing or by simulation. P is the temperature difference between the known temperature measured value and the temperature value to be calculated, for example, the temperature difference between the value measured by a heating wire temperature sensor and the temperature to be calculated of the heated backrest surface or the heated seat surface. I is the integral of the above-mentioned P-value over time, that is, $$I=\int_{t0}^{t}P(t')dt'$$

t0 is the start time of the heating period or another specified time. t is the end of the heating period or another specified time. t' is the time-dimensioned integration variable. In the present case, t0 is, for example, the time at which $P_{OUT}$ becomes less than the maximum output power. I is zero when $P_{OUT}$ reaches maximum output power. D is the gradient or steepness of the temperature change, that is, the rise or fall in temperature.

The principle of temperature determination can be adapted to different heating devices or seat constructions with little effort by using appropriate control algorithms. For this purpose, only the seat-specific constants $K_P$, $K_I$ and $K_D$ need to be determined and stored in the control unit. The constants can be determined in thermal tests or in the context of simulations. The time-consuming development and implementation of a seat-specific temperature determination can therefore be dispensed with.

The object on which the invention is based is further achieved by a method of the type mentioned at the outset, wherein in the scope of the invention, the temperature of the heating wire is determined based on the temperature measured values of the printed circuit board temperature sensor and the at least one heating wire temperature sensor by a data processing device of the electronic control unit. A heating device according to one of the embodiments described above is preferably operated by means of the method according to the invention. The method preferably comprises controlling and/or regulating the heating of the heating wire as a function of the determined temperature of the heating wire.

In a preferred embodiment of the method according to the invention, the at least one temperature measured value is detected by means of at least one heating wire temperature sensor of the electronic control unit by detecting a first temperature measured value and detecting a second temperature measured value. The first temperature measured value is detected by means of a first heating wire temperature sensor of the electronic control unit, which is thermally coupled to the heating wire of the heating device. The second temperature measured value is detected by means of a second heating wire temperature sensor of the electronic control unit, which is thermally coupled to the heating wire of the heating device. The temperature of the heating wire is preferably determined based on the temperature measured values of the printed circuit board temperature sensor and the at least one heating wire temperature sensor by determining a first heating wire temperature and determining a second heating wire temperature. The first heating wire temperature is determined based on the temperature measured values of the first heating wire temperature sensor and the printed circuit board temperature sensor. The second heating wire temperature is determined based on the temperature measured values of the second heating wire temperature sensor and the printed circuit board temperature sensor. A redundant temperature measurement is thus carried out on the heating wire, which supplies two heating wire temperatures. The determined heating wire temperatures can be used in the context of a control or regulation of the seat heating.

In a further preferred embodiment of the method according to the invention, the first heating wire temperature and the second heating wire temperature are compared with one another in order to detect a functional impairment, particularly a defect of the first heating wire temperature sensor, the second heating wire temperature sensor and/or the printed circuit board temperature sensor. Alternatively or additionally, the change over time of the first heating wire temperature and the change over time of the second heating wire temperature are compared with one another in order to detect a functional impairment, particularly a defect, of the first heating wire temperature sensor, the second heating wire temperature sensor and/or the circuit board temperature sensor based on the comparison. In addition, the method can comprise determining a notional heating wire temperature taking into account the first heating wire temperature and the second heating wire temperature. Alternatively or additionally, in the context of the method, the heating of the heating wire is controlled and/or regulated as a function of the determined notional heating wire temperature.

BRIEF DESCRIPTION OF THE DRAWINGS

Preferred embodiments of the invention are explained and described in more detail below with reference to the accompanying drawings. Shown are.

DETAILED DESCRIPTION

Figure 1:
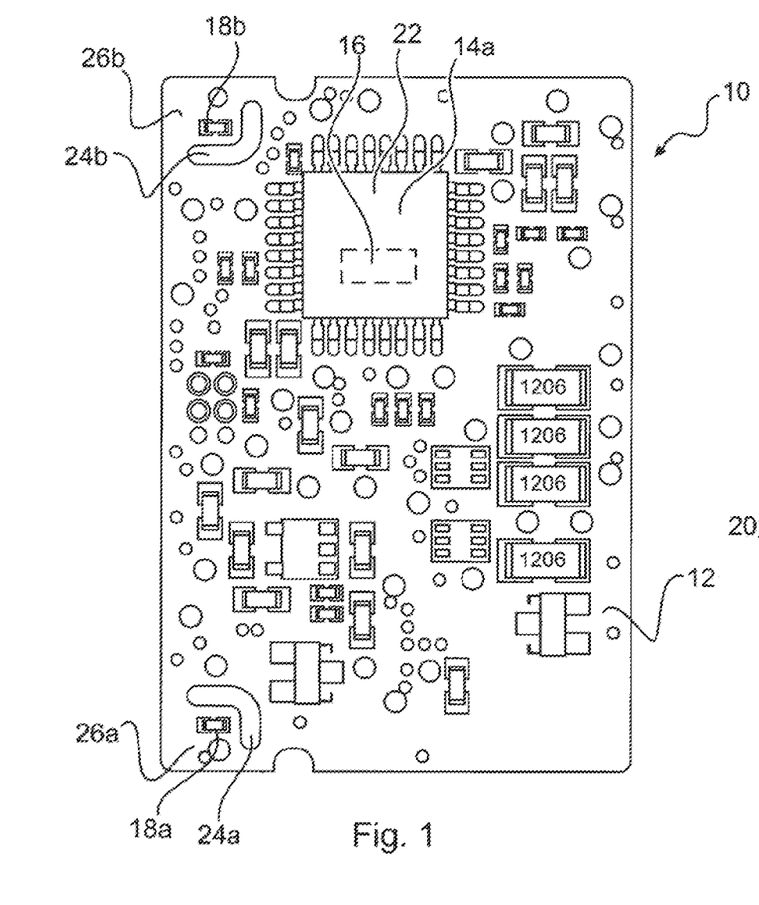
FIG. 1 an embodiment of the electronic control unit according to the invention in a top view.
Figure 2:
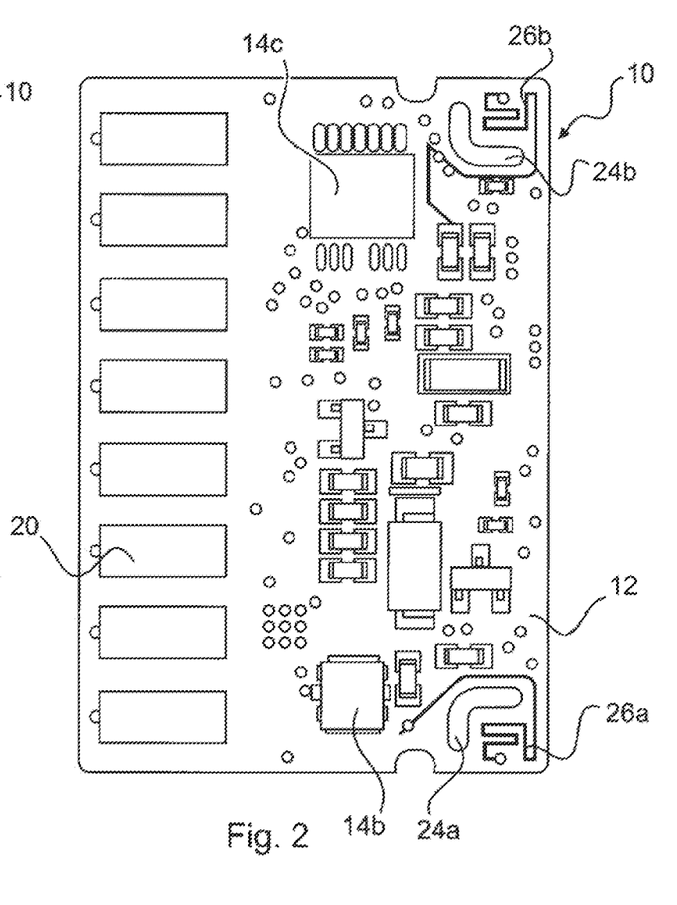
FIG. 2 the electronic control unit shown in FIG. 1 in a rear view.

FIGS. 1 and 2 show the front and back sides of a printed circuit board 12 of an electronic control unit 10 for a heating device 100 of a vehicle seat.

A plurality of heat sources 14a-14c are arranged on the printed circuit board 12. The heat sources 14a-14c are integrated circuits, wherein the heat source 14a is a microcontroller. The heat source 14b is a low-side driver (LS circuit) and the heat source 14c is a high-side driver (HS circuit).

Three temperature sensors 16, 18a, 18b designed as NTC resistors are arranged on the printed circuit board 12. The printed circuit board temperature sensor 16 is part of the microcontroller 14 and is thus thermally coupled to the microcontroller 14a. Due to the arrangement of the microcontroller 14a on the printed circuit board 12, the printed circuit board temperature sensor 16 is also thermally coupled to the heat source 14c.

The heating wire temperature sensors 18a, 18b are arranged in corner regions 26a, 26b of the printed circuit board 12 and are configured to be thermally coupled to a heating wire 102 of the heating device 100. For this purpose, the heating wire temperature sensors 18a, 18b can be in contact with wire sections 104a, 104b of the heating wire 102. Alternatively, the heating wire temperature sensors 18a, 18b can also be arranged in the vicinity of wire sections 104a, 104b of the heating wire.

In addition, connection regions 20 for additional electronic components, particularly measuring devices, are arranged on the printed circuit board 12. For example, an additional external temperature sensor can be coupled to the printed circuit board electronics via the connection region 20. The additional external temperature sensor can be arranged at a distance from the printed circuit board 12 and provide additional temperature measured values.

The electronic control unit 10 has a data processing device 22, wherein, in the embodiment shown, the heat source 14a embodied as a microcontroller represents the data processing device 22. By means of the data processing device 22, the temperature of the heating wire 102 can be determined redundantly based on the temperature measured values TS1, TS2, TS3 of the printed circuit board temperature sensor 16 and the heating wire temperature sensors 18a, 18b.

The heating wire temperature sensors 18a, 18b determine the temperature of the heating wire 102 only approximately, since the temperature measured values TS1, TS2 of the heating wire temperature sensors 18a, 18b are falsified by the integration of the heating wire temperature sensors 18a, 18b in the control unit 10 by external thermal influences. However, the measured value falsification caused by the thermal influences can be calculated out by taking into account the temperature measured value TS3 of the printed circuit board temperature sensor 16.

The thermal influences of the heat sources 14a-14c on the heating wire temperature sensors 18a, 18b are thus essentially avoided, the heating wire temperature sensors 18a, 18b are thermally insulated from the plurality of heat sources 14a-14c arranged on the printed circuit board 12. The thermal insulation of the heating wire temperature sensors 18a, 18b is implemented via L-shaped recesses 24a, 24b in the printed circuit board 12. The recess 24a acts as a heat flow barrier for the heating wire temperature sensor 18a. The recess 24b acts as a heat flow barrier for the heating wire temperature sensor 18b.

Figure 3:
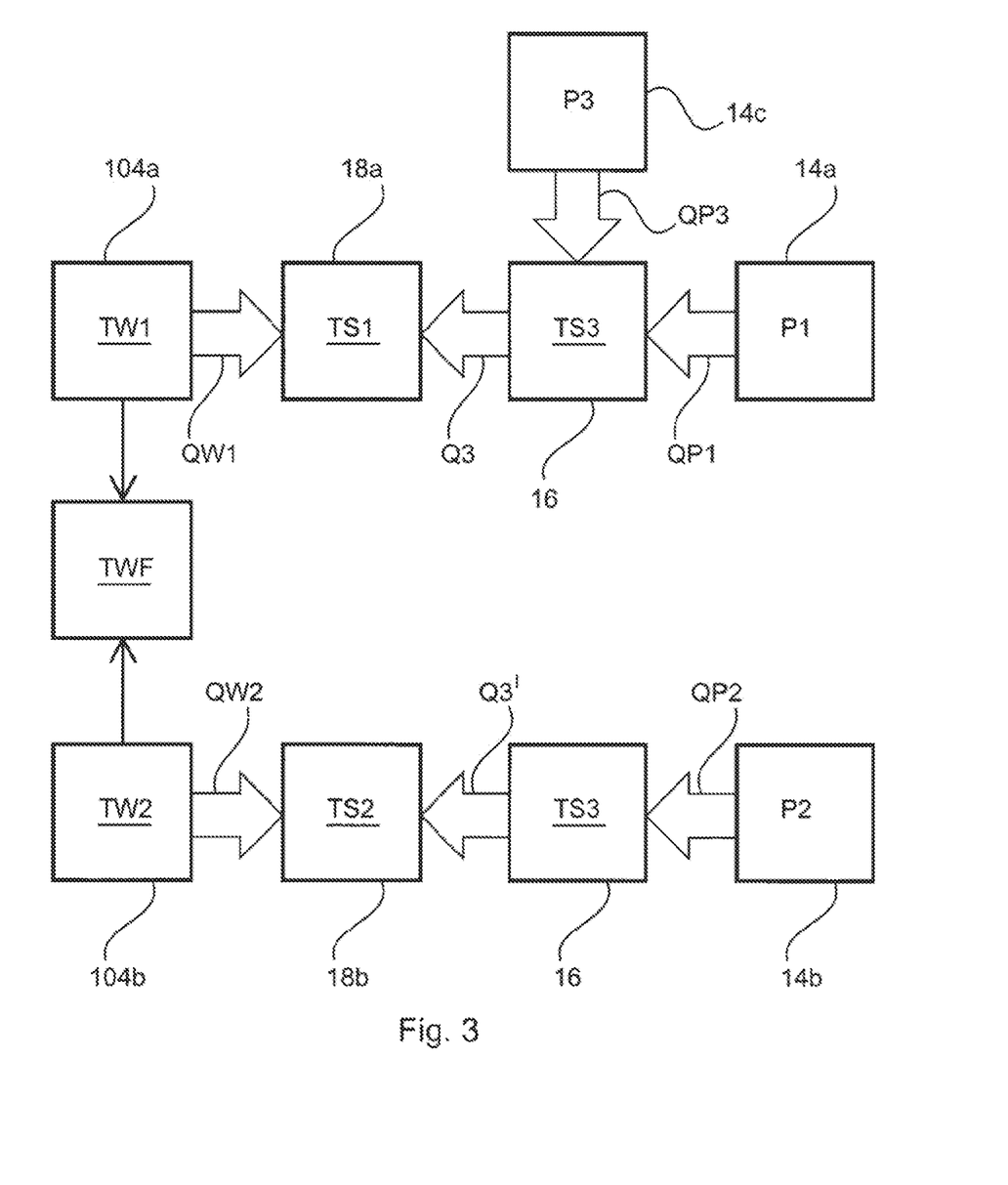
FIG. 3 the determination of heating wire temperatures in a schematic block diagram.

FIG. 3 shows the redundant determination of the heating wire temperature TW1, TW2, which takes place according to the following principle:

Due to the thermal coupling of the heating wire temperature sensor 18a to a wire section 104a of the heating wire 102, heat QW1 is transferred from the wire section 104a in the direction of the heating wire temperature sensor 18a. In addition, heat Q3 is transferred from the region in which the printed circuit board temperature sensor 16 is arranged to the heating wire temperature sensor 18*a*. The region in which the printed circuit board temperature sensor 16 is arranged is also heated by the heat QP1 emanating from the heat source 14*a* and the heat QP3 emanating from the heat source 14*c*. The heat source 14*a* is heated by supplying energy P1. The heat source 14*c* is heated by supplying energy P3. Based on the assumption that the temperature measured value TS1 of the heating wire temperature sensor 18*a* remains constant, the following relationship results:

$$Q3 - QW1 = 0$$

Since the heat transfer results from the product of the temperature difference between the heat exchange objects and various constants, the following relationship can be derived:

$$TW1 = \text{Total Constants}1 \times TS1 - \text{Total Constants}2 \times TS3.$$

Thus, the heating wire temperature TW1 can be determined based on the temperature measured values TS1, TS3 of the first heating wire temperature sensor 18*a* and the printed circuit board temperature sensor 16, provided that the total constants have been determined beforehand.

Due to the thermal coupling of the heating wire temperature sensor 18*b* to a wire section 104*b* of the heating wire 102, heat QW2 is transferred from the wire section 104*b* in the direction of the heating wire temperature sensor 18*b*. In addition, heat Q3' is transferred from the region in which the printed circuit board temperature sensor 16 is arranged to the heating wire temperature sensor 18*a*. The region in which the printed circuit board temperature sensor 16 is arranged is also heated by the heat QP2 emanating from the heat source 14*b*. The heat source 14*b* is heated by supplying energy P2. Based on the assumption that the temperature measured value TS2 of the heating wire temperature sensor 18*a* remains constant, the following relationship results:

$$Q3' - QW2 = 0$$

Since the heat transfer results from the product of the temperature difference between the heat exchange objects and various constants, the following relationship can be derived:

$$TW2 = \text{Total Constants}3 \times TS2 - \text{Total Constants}4 \times TS3.$$

Thus, the heating wire temperature TW2 can be determined based on the temperature measured values TS2, TS3 of the second heating wire temperature sensor 18*a* and the printed circuit board temperature sensor 16, provided that the total constants have been determined beforehand.

The redundant temperature measurement thus allows the determination of two heating wire temperatures TW1, TW2. These heating wire temperatures TW1, TW2 can be used for detecting a functional impairment, particularly a defect, of the first heating wire temperature sensor 18*a*, the second heating wire temperature sensor 18*b* or the printed circuit board temperature sensor 16. For this purpose, the first heating wire temperature TW1 and the second heating wire temperature TW2 are compared with one another. If the difference between the first heating wire temperature TW1 and the second heating wire temperature TW2 lies above a differential temperature limit value, a functional impairment, particularly a defect, of a heating wire temperature sensor 18*a*, 18*b* or the printed circuit board temperature sensor 16 can be assumed. The differential temperature limit value can be a static or a dynamic value. If the differential temperature limit value is a dynamic value, it can be dependent, for example, on the temperature value TS3 detected by the printed circuit board temperature sensor 16.

Alternatively or additionally, the change over time of the first heating wire temperature TW1 and the change over time of the second heating wire temperature TW2 can be compared with one another in order to detect a functional impairment of the temperature detection. In addition, maximum value monitoring of the first heating wire temperature TW1 and/or the second heating wire temperature TW2 can be carried out for detecting a functional impairment. If the first heating wire temperature TW1 or the second heating wire temperature TW2 exceeds a maximum temperature occurring during the proper operation of the control unit 10, a functional impairment of a heating wire temperature sensor 18*a*, 18*b* or the printed circuit board temperature sensor 16 can be assumed.

The electronic control unit 10 is preferably used to control or regulate the heating of the heating wire 102 as a function of a determined notional heating wire temperature TWF. The notional heating wire temperature TWF can be determined taking into account the first heating wire temperature TW1 and the second heating wire temperature TW2. For example, the notional heating wire temperature TWF can be determined by averaging or weighting the first heating wire temperature TW1 and the second heating wire temperature TW2.

Figure 4:
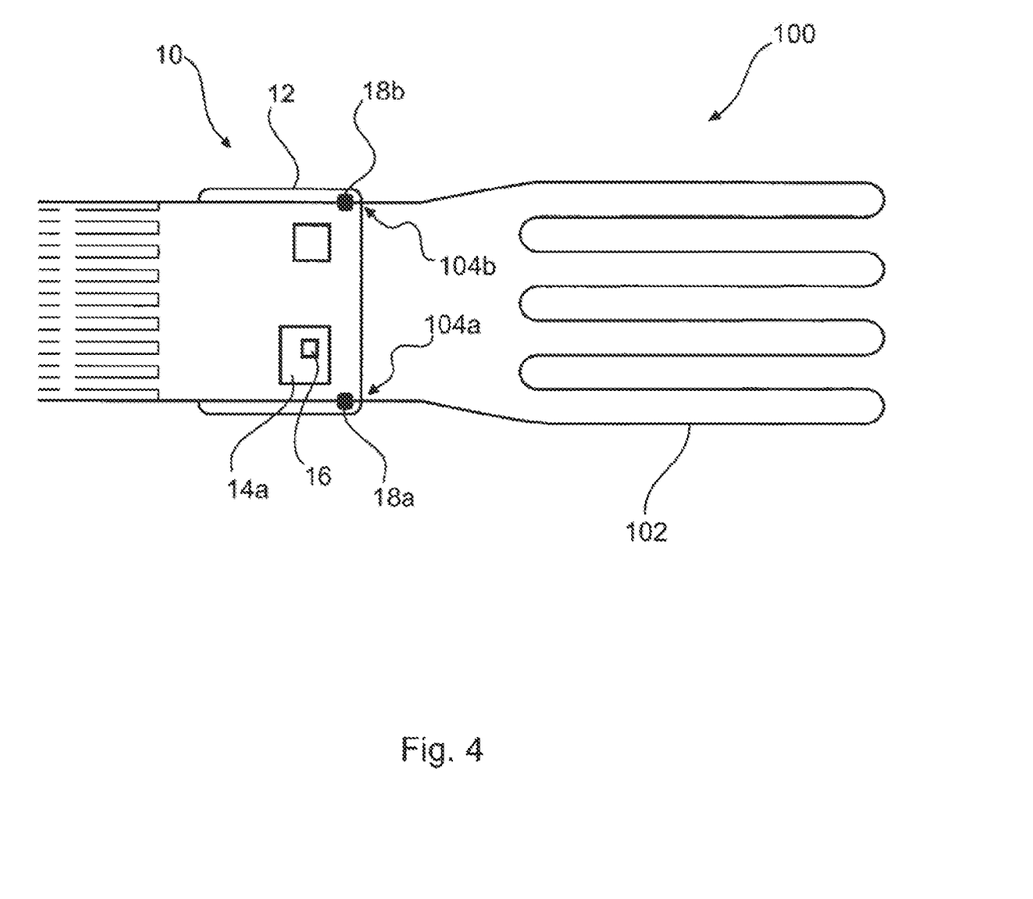
FIG. 4 a heating device according to the invention in a schematic representation.

FIG. 4 shows a heating device 100 having a heatable heating wire 102 and an electronic control unit 10. The electronic control unit 10 is used for controlling the heating of the heating wire 102 and for monitoring the temperature of the heating wire 102.

The illustrated heating device 100 can be used, for example, in a heatable vehicle seat which comprises a seat cushion and a backrest. The seat cushion provides a seat surface for the buttocks of a user. The backrest provides a backrest surface for the back of the user. The heating wire 102 can be integrated into the seat cushion and/or the backrest and heat the seat surface and/or the backrest surface during the operation of the heating device 100.

FIG. 4 also shows that the wire sections 104*a*, 104*b* of the heating wire 102, to which the heating wire temperature sensors 18*a*, 18*b* are thermally coupled, represent segments of the heating wire 102 that are spaced apart from one another. In the embodiment shown, the heating wire 102 is fixed to the electronic control unit 10 in only two regions. In principle, the heating wire 102 can also be fixed to the control unit 10 in more than two regions. Different heating wires 102 can also be coupled to the electronic control unit 10.

Figure 5:
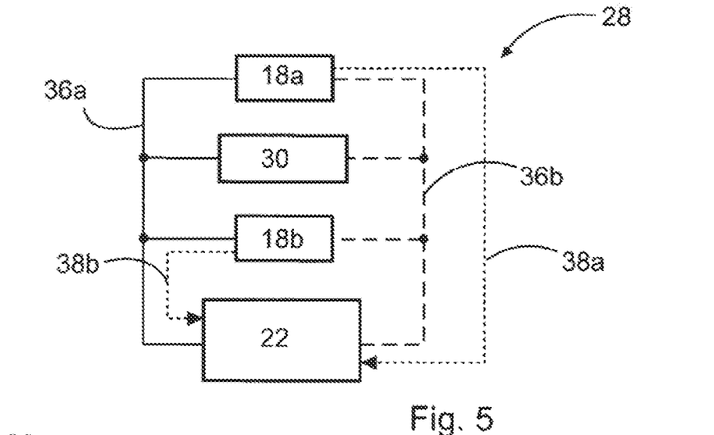
FIG. 5 an interconnection of a control unit according to the invention in a schematic representation.

FIG. 5 shows an interconnection 28 of a control unit 10 having a first heating wire temperature sensor 18*a*, a second heating wire temperature sensor 18*b*, a data processing device 22 and a voltage source 30. The electrical power is supplied to the first heating wire temperature sensor 18*a*, the second heating wire temperature sensor 18*b* and the data processing device 22 via the lines 36*a*, 36*b*. The measurement signal transmission between the first heating wire temperature sensor 18*a* and the data processing device 22 takes place via the line 38*a*. The measurement signal transmission between the second heating wire temperature sensor 18*b* and the data processing device 22 takes place via the line 38*b*.

Figure 6:
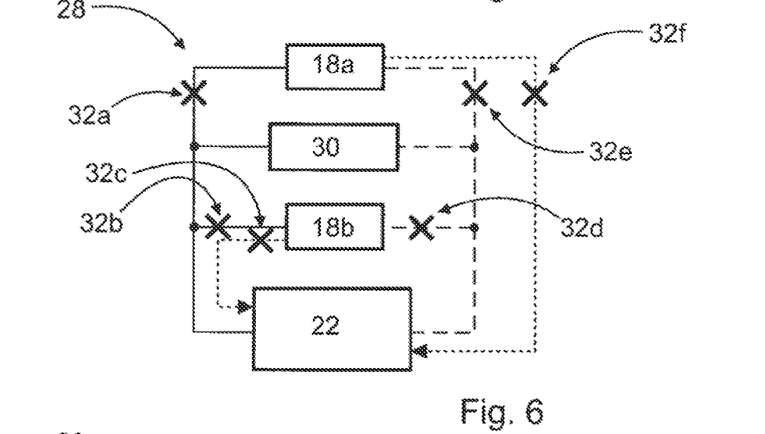
FIG. 6 possible line defects of the interconnection shown in FIG. 5 in a schematic representation.
Figure 7:
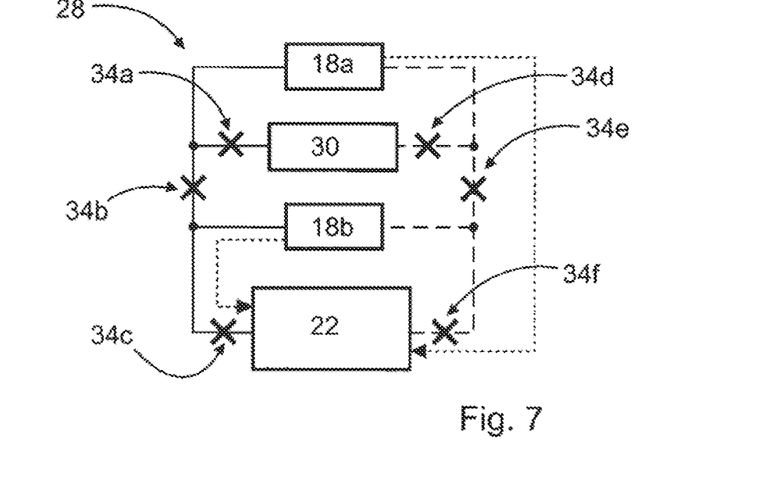
FIG. 7 further possible line defects of the interconnection shown in FIG. 5 in a schematic representation.

FIG. 6 shows possible line defects 32*a*-32*f* in the interconnection 28, in which only one of the two heating wire temperature sensors 18*a*, 18*b* fails. Only the heating wire temperature sensor 18a fails in line defects 32a, 32e, 32f. Only the heating wire temperature sensor 18b fails in line defects 32b, 32c, 32d, FIG. 7 shows possible line defects 34a-34f in the interconnection 28, in which both heating wire temperature sensors 18a, 18b fail. In these line defects 34a-34f, however, the data processing device 22 can detect the failure of both heating wire temperature sensors 18a, 18b so that, for example, the operation of the heating device 100 can be adjusted or interrupted accordingly. An unnoticed failure of both heating wire temperature sensors 18a, 18b can be effectively avoided via the interconnection 28.

REFERENCE NUMBERS 10 control unit
12 printed circuit board
14a-14c heat sources
16 printed circuit board temperature sensor
18a, 18b heating wire temperature sensors
20 connection regions
22 data processing device
24a, 24b recess
26a, 26b corner regions
28 interconnection
30 voltage source
32a-32f line defects
34a-34f line defects
36a, 36b lines
38a, 38b lines
100 heating device
102 heating wire
104a, 104b wire sections
P1, P2, P3 energies
TS1, TS2 temperature measured values of the heating wire temperature sensors
TS3 temperature measured values of the printed circuit board temperature sensor
TW1, TW2 heating wire temperatures
TWF notional heating wire temperature
QW1, QW2 heat
Q3, Q3' heat
QP1, QP2, QP3 heat

The invention claimed is:

1. An electronic control unit for a heating device of a vehicle seat, comprising:
   a printed circuit board on which one or more heat sources are arranged;
   a printed circuit board temperature sensor which is thermally coupled to at least one of the one or more heat sources on the printed circuit board;
   at least one heating wire temperature sensor configured to be thermally coupled to a heating wire of the heating device; and
   a data processing device configured to determine a temperature of the heating wire of the heating device by approximating a temperature of the heating wire with the at least one heating wire sensor temperature sensor and then calculating out a thermal influence acting on the at least one heating wire temperature sensor caused by the one or more heat sources on the printed circuit board based on a determined temperature value of the one or more heat sources using the printed circuit board temperature sensor.

2. The electronic control unit according to claim 1, wherein the printed circuit board temperature sensor and/or the at least one heating wire temperature sensor, each designed as a thermistor, are arranged on the printed circuit board and/or are integrated or embedded in the printed circuit board or in an electronic component arranged on the printed circuit board.

3. The electronic control unit according to claim 1, wherein the at least one heating wire temperature sensor is thermally insulated from the one or more heat sources and/or the printed circuit board temperature sensor.

4. The electronic control unit according to claim 1, wherein the printed circuit board has at least one recess positioned between the at least one heating wire temperature sensor and the one or more heat sources and/or the printed circuit board temperature sensor to thermally in the at least one heating wire temperature sensor from the one or more heat sources and/or the printed circuit board temperature sensor.

5. The electronic control unit according to claim 4, wherein the recess is L-shaped or arcuate.

6. The electronic control unit according to claim 1, wherein a first heating wire temperature sensor and a second heating wire temperature sensor are each configured to be thermally coupled to the heating wire of the heating device, wherein the data processing device is configured to determine a first heating wire temperature based on the temperature measured values of the first heating wire temperature sensor and a second heating wire temperature based on the temperature measured values of the second heating wire temperature sensor.

7. The electronic control unit according to claim 6, wherein the data processing device is configured to determine a first heating wire temperature based on the temperature measured values of the first heating wire temperature sensor and the printed circuit board temperature sensor and a second heating wire temperature based on the temperature measured values of the second heating wire temperature sensor and the printed circuit board temperature sensor.

8. The electronic control unit according to claim 6, wherein an interconnection in which the first heating wire temperature sensor, the second heating wire temperature sensor, and the data processing device are connected to one another and to a voltage source such that in an event of a line defect in the interconnection, either only one heating wire temperature sensor fails or the data processing device can detect the failure of both heating wire temperature sensors.

9. The electronic control unit according to claim 6, wherein the first heating wire temperature sensor and the second heating wire temperature sensor are each arranged in corner regions of the printed circuit board.

10. The electronic control unit according to claim 6, wherein the data processing device is configured to compare the first heating wire temperature and the second heating wire temperature with one another for detecting a functional impairment of the first heating wire temperature sensor, the second heating wire temperature sensor, and/or the printed circuit board temperature sensor.

11. The electronic control unit according to claim 5, wherein the data processing device is configured to compare a change over time of the first heating wire temperature and a change over time of the second heating wire temperature with one another for detecting a functional impairment of the first heating wire temperature sensor, the second heating wire temperature sensor, and/or the printed circuit board temperature sensor.

12. The electronic control unit according to claim 6, wherein the control unit is configured to control or regulate a heating of the heating wire as a function of a determined notional heating wire temperature and the notional heating wire temperature taking into account the first heating wire temperature and the second heating wire temperature.

13. A heating device for a vehicle seat, comprising:
   at least one heating wire; and
   the electronic control unit of claim 1, which is configured to control the heating of the heating wire and to monitor the temperature of the heating wire.

14. A heatable vehicle seat comprising:
   a seat cushion which provides a seat surface for a buttocks of a user;
   a backrest which provides a backrest surface for a back of the user; and
   the heating device according to claim 13, the at least one heating wire is integrated into the seat cushion and/or the backrest and is configured to heat the seat surface and/or the backrest surface.

15. The heatable vehicle seat according to claim 14, wherein the data processing device of the electronic control unit is configured to determine a current temperature of the heating device, a current temperature of the backrest surface of the backrest heated by the heating device and/or a current temperature of the seat surface of the seat cushion heated by the heating device based on the temperature measured values of the printed circuit board temperature sensor and/or of the at least one heating wire temperature sensor.

16. An electronic control unit for a heating device of a vehicle seat, comprising:
   a printed circuit board comprising one or more heat sources;
   a printed circuit board temperature sensor that is thermally coupled to at least one of the one or more heat sources on the printed circuit board;
   a first heating wire temperature sensor and a second heating wire temperature sensor configured to be thermally coupled to a heating wire of the heating device;
   a data processing device configured to determine a temperature of the heating wire based on temperature measured values of the printed circuit board temperature sensor and at least one of the first heating wire temperature sensor and the second heating wire temperature sensor;
   wherein the data processing device is configured to compare a temperature measured value from the first heating wire temperature and a temperature measured value from the second heating wire temperature to one another to detect a functional impairment or defect of the first heating wire temperature sensor, the second heating wire temperature sensor, and/or the printed circuit board temperature sensor.

17. The electronic control unit according to claim 16, wherein the printed circuit board temperature sensor, the first heating wire temperature sensor, and/or the second heating wire temperature sensor is/are designed as a thermistor, is/are arranged on the printed circuit board, and/or is/are integrated or embedded in the printed circuit board or in an electronic component arranged on the printed circuit board.

18. The electronic control unit according to claim 17, wherein the printed circuit board has at least one recess positioned between the first heating wire temperature sensor and/or the second heating wire temperature sensor and the one or more heat sources and/or the printed circuit board temperature sensor to thermally insulate or thermally decouple the first heating wire temperature sensor and/or the second heating wire temperature sensor from the one or more heat sources and/or the printed circuit board temperature sensor.

19. The electronic control unit according to claim 18, wherein the first heating wire temperature sensor and the second heating wire temperature sensor are each arranged in a corner region of the printed circuit board, and the recess is positioned between the at least one heat source and both of the first heating wire temperature sensor and the second heating wire temperature sensor.

20. An electronic control unit for a heating device of a vehicle seat, comprising:
   a printed circuit board comprising one or more heat sources;
   a printed circuit board temperature sensor that is thermally coupled to at least one of the one or more heat sources on the printed circuit board;
   a first heating wire temperature sensor and a second heating wire temperature sensor configured to be thermally coupled to a heating wire of the heating device;
   a data processing device configured to determine a temperature of the heating wire based on temperature measured values of the printed circuit board temperature sensor and at least one of the first heating wire temperature sensor and the second heating wire temperature sensor;
   wherein the data processing device is configured to compare a change over time of a temperature measured value by the first heating wire temperature and a change over time of a temperature measured value by the second heating wire temperature with one another for detecting a functional impairment or defect of the first heating wire temperature sensor, the second heating wire temperature sensor, and/or the printed circuit board temperature sensor.

21. The electronic control unit according to claim 20, wherein the printed circuit board temperature sensor, the first heating wire temperature sensor, and/or the second heating wire temperature sensor is/are designed as a thermistor, is/are arranged on the printed circuit board, and/or is/are integrated or embedded in the printed circuit board or in an electronic component arranged on the printed circuit board.

22. The electronic control unit according to claim 21, wherein the printed circuit board has at least one recess positioned between the first heating wire temperature sensor and/or the second heating wire temperature sensor and the one or more heat sources and/or the printed circuit board temperature sensor to thermally insulate or thermally decouple the first heating wire temperature sensor and/or the second heating wire temperature sensor from the one or more heat sources and/or the printed circuit board temperature sensor.

23. The electronic control unit according to claim 22, wherein the first heating wire temperature sensor and the second heating wire temperature sensor are each arranged in a corner region of the printed circuit board, and the recess is positioned between the at least one heat source and both of the first heating wire temperature sensor and the second heating wire temperature sensor.

* * * * *